April 7, 1970  R. RUTLEY  3,504,753
ARTICULATED VEHICLE
Filed April 29, 1968  7 Sheets-Sheet 1
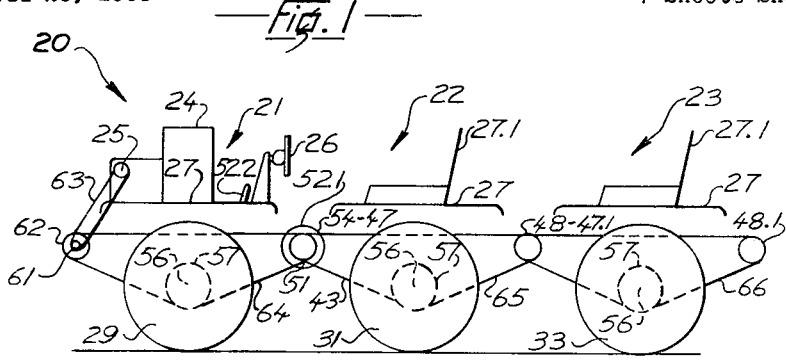
Fig. 1
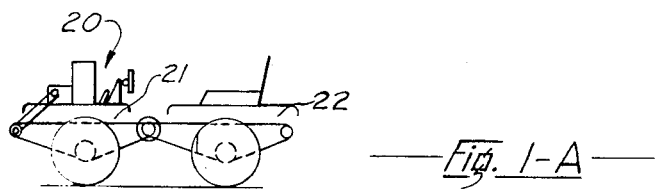
Fig. 1-A
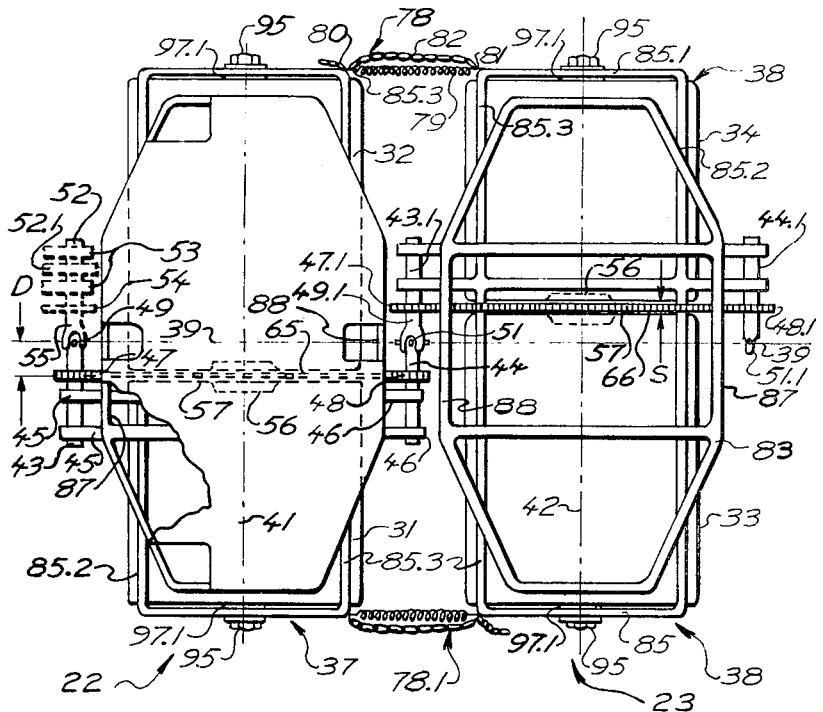
Fig. 2
Russell Rutley,
Inventor
by Lyle C. Trorey,
Agent April 7, 1970      R. RUTLEY      3,504,753

ARTICULATED VEHICLE

Filed April 29, 1968      7 Sheets-Sheet 2

Russell Rutley,
Inventor by Lyle G. Trorey,
Agent

April 7, 1970      R. RUTLEY      3,504,753
ARTICULATED VEHICLE
Filed April 29, 1968      7 Sheets-Sheet 4
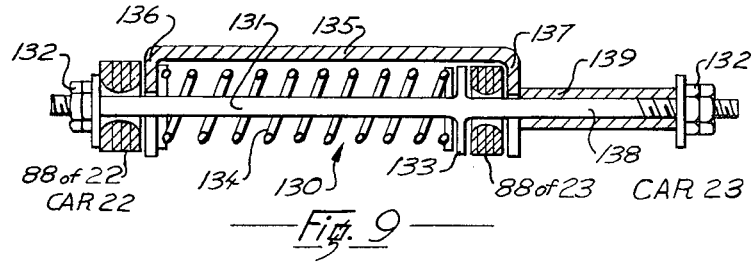
Fig. 9
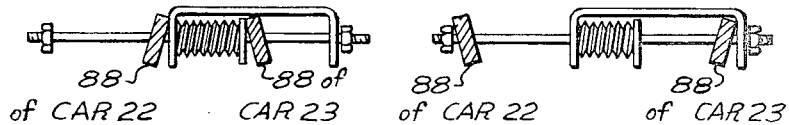
Fig. 10      Fig. 11
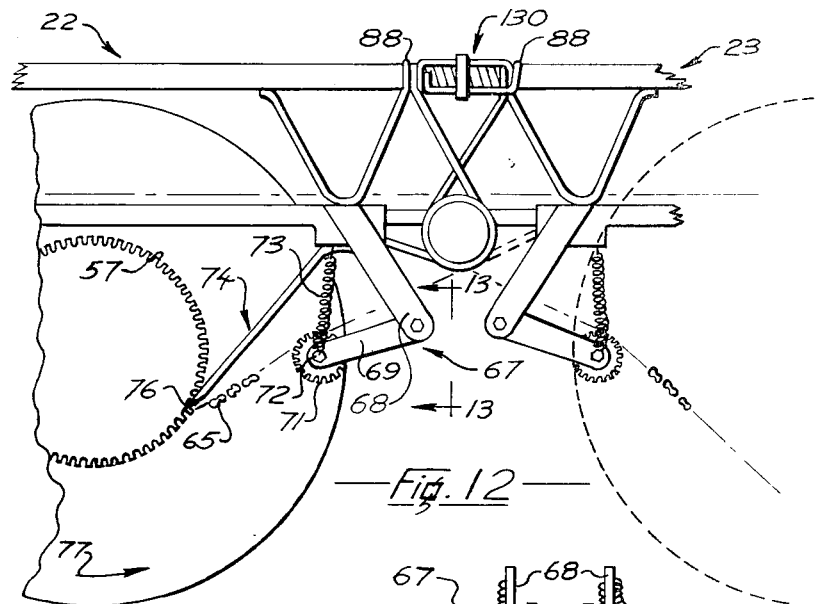
Fig. 12
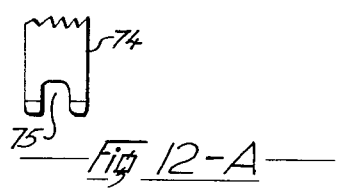
Fig. 12-A
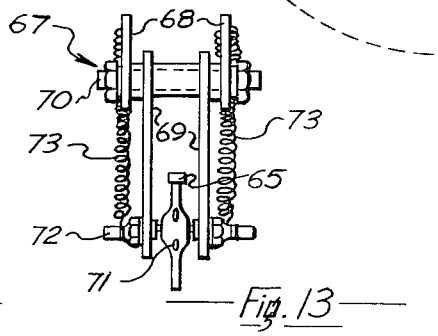
Fig. 13
Russell Rutley,
Inventor
by Lyle G. Trorey,
Agent

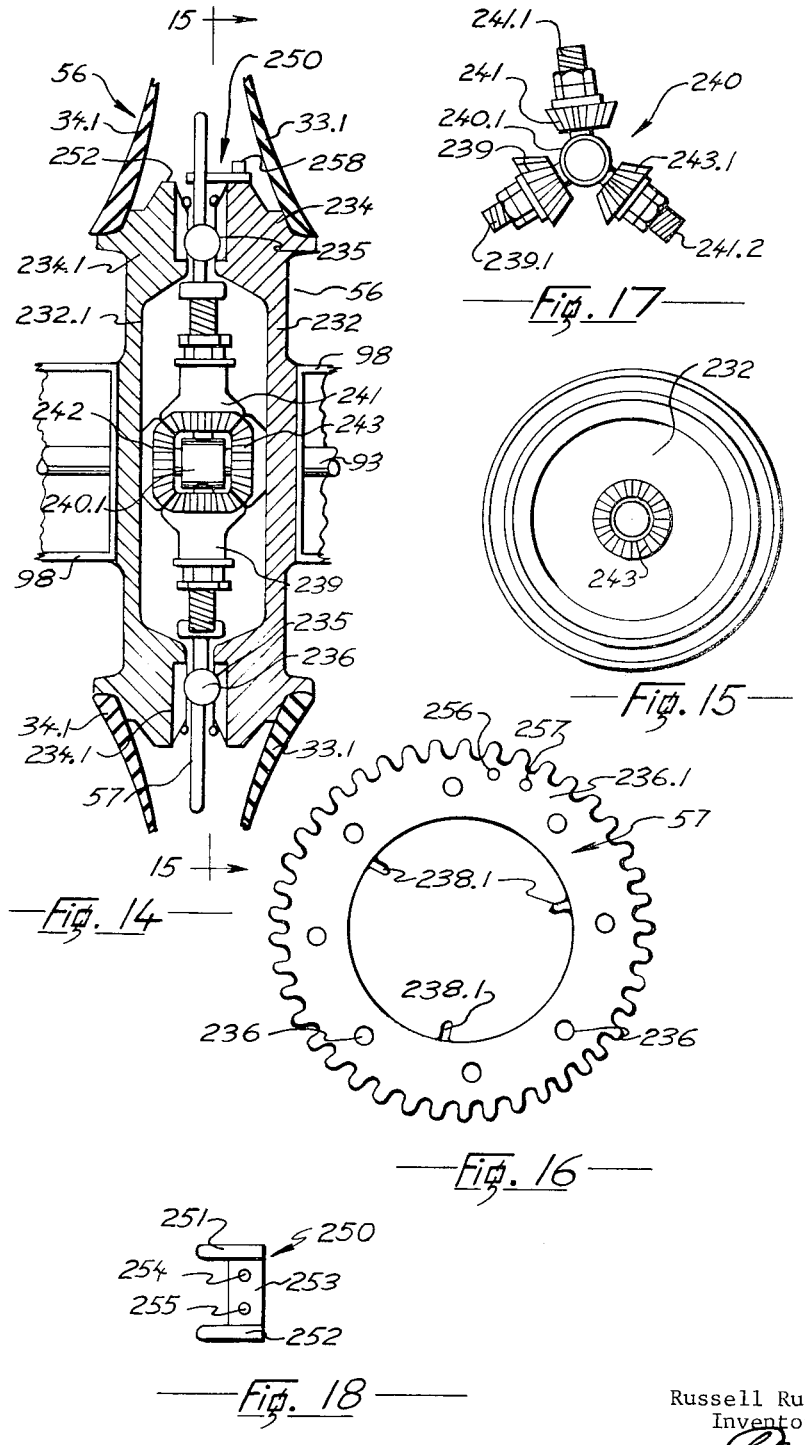

Russell Rutley,
Inventor by Lyle G. Trorey,
Agent

United States Patent Office 3,504,753
Patented Apr. 7, 1970

3,504,753
ARTICULATED VEHICLE
Russell Rutley, Nanaimo, British Columbia, Canada
(Line Ridge, R.R. 1, Wellington, British Columbia, Canada)
Filed Apr. 29, 1968, Ser. No. 724,983
Claims priority, application Great Britain, May 3, 1967, 20,412/67
Int. Cl. B62k *17/34*
U.S. Cl. 180—14                           31 Claims

ABSTRACT OF THE DISCLOSURE

Articulated vehicle of at least two cars, closely spaced ground engagement means preferably tracks, or wheels having low pressure tires, co-axial of a transverse axis of each car and having total width substantially that of the cars. Prime mover driving a sprocket of a differential of each car with the wheels or tracks spaced apart centrally for a drive chain. Vertical stabilizing means between adjacent frame members of the cars, adapted to control jack knifing in a vertical plane. Steering gear for relative rotation of the first and second cars, provision for adding cars with each car being driven.

CROSS REFERENCES TO RELATED APPLICATIONS

The invention relates to a self-propelled articulated vehicle having at least two cars, each car having co-axial, preferably closely spaced, ground engaging elements for instance wheels or tracks.

U.S. patent application 582,650 of the present inventor, now abandoned, relates to an articulated vehicle of the same general class, but differing in material respects from the invention now disclosed. A co-pending British provisional specification of the same inventor, Ser. No. 20,412 filed May 3, 1967 teaches structure included in the instant application, which application is further development and improvement upon the teaching of the British specification.

BACKGROUND OF THE INVENTION

Field of the invention

The invention relates to articulated vehicles of a type as first aforesaid particularly, but not exclusively, adapted for the transportation of loads in areas without roads and over rough terrain.

For example, trappers, prospectors, forest fighting crews and construction crews require to move supplies, equipment and men in regions which may be difficult to traverse even with pack trains, tracked vehicles, or four-wheel drive vehicles. It would be of advantage in these general conditions to provide a powered vehicle capable of travelling through forest trails, over snow, ice, and soft or marshy ground. It would be a further advantage to provide a vehicle which can readily be dismantled into units to be back-packed if necessary over portages or difficult ground, such units also being adapted for transportation by light aircraft or other limited load carrying means.

The vehicle should be narrow to permit travel on a trail or, for instance, between closely spaced trees or other obstructions. The narrow vehicle should be capable of being lengthened, by adding cars to attain adequate load capacity. The long narrow vehicle should be flexible to enable it to negotiate sharp turns necessitated, for instance, by passage through obstructions as above, and should be stable. In a wheeled vehicle having such attributes, desirably all wheels should be driven and the drive means should be simple, light, and rugged.

Description of the prior art

The prior art is extensive relating to railway and locomotive, tracked vehicle, road transportation, and like arts. U.S. Patent 1,373,981 issued to George M. Smith in 1921, and teaches a half universal joint at an end of one vehicle cooperating with similar structure of an adjacent vehicle providing drive. U.S. Patent 1,704,296 granted in 1929 to Hans Ledwinka of Koprivnice teaches swivelling half axles and other ingenious structure. Marsh buggies for instance as a Crain et al. U.S. Patent 3,048,233 issued in 1962 have wide ground engaging means, here tires with a mud tread. Linn also teaches ball and socket, i.e. universal, transmission means in his U.S. Patent 1,045,992 granted in 1912.

SUMMARY OF THE INVENTION

The present invention distinguishes over the above, and other, ingenious prior art—taken either alone or in combination—by structure a central concept of which is a vertical stabilizing means hereinafter particularized, embodied in a vehicle having attributes above, and being constructed and arranged to reduce the difficulties and disadvantages of adaptations of previous known vehicles to the instant purposes.

Rickshaws and gigs are light vehicles having two spaced apart co-axial wheels. As is well known, these configurations are distinguished by a property of manoeuverability, since each is capable of rotation about a vetrical axis central of the wheels. Both vehicles are unstable, and require to be restrained in a generally horizontal position by shafts or the like, supported by a man or by a horse.

A vehicle according to the present invention has at least two cars, each car being a rickshaw or gig-like structure in that each has spaced axially-aligned ground engaging means, namely wheels or tracks. Each car has a longitudinal axis central thereof, the wheel axis being transverse thereof. Stability is attained by securing adjacent ends of the cars to one another by a vertical stabilizing means extending preferably centrally between adjacent frame members of the two cars. One car of the two cars is a power car having a prime mover, and means operatively connecting the prime mover to a ground engagement means, so as to drive the vehicle. Coupling means are provided to secure the adjoining cars, the coupling means having a centre on the car longitudinal axis and being constructed and arranged for relative rotation of the cars both about a horizontal and about a vertical axis passing through the coupling means, the coupling means also being adapted to permit one car to rotate with respect to the other car about its longitudinal axis so that relative motion of the two cars, resulting for example when one wheel meets a ground irregularity, can take place.

It is to be understood that draw bar pull between the two cars is effected mainly by the coupling means aforesaid, with the vertical stabilizing means effecting vertical stabilizing. The two cars thus form an articulated vehicle capable of traversing rough terrain, and of negotiating sharp bends. For the latter purpose, that is to say for steering, means are provided to rotate the one car with respect to the other car in a horizontal plane, the rotation being centered at the coupling means aforesaid.

The invention also provides coupling means adapted to drive a ground engaging means of the second car.

A space is defined between the ground engaging means, and a differential having a sprocket is provided in the space, the axle being central of the sprocket. The differential sprocket of the power car is disposed at one side of its longitudinal axis, with the differential sprocket of the second car being oppositely disposed from the longitudinal axis of the second car. Chain drive means cooperating with a drive sprocket of the power car also drive an intermediate sprocket of a shaft of the coupling means, thus rotating the said shaft. In this manner the second car having a shaft adapted to be rotated when the coupling means shaft of the power car is rotated, is similarly driven by rotation of the shaft last aforesaid.

While a conventional differential can be used, a differential is provided in which there is deliberately introduced free motion, of the nature of backlash, of about a third of a revolution of the differential sprocket. This is advantageous in certain terrain conditions, as will be appreciated by those skilled in the art. Further, means are provided selectively to lock any differential or all differentials where, for instance ice conditions, might render this advantageous.

Particularly on soft or marshy ground, and in certain snow conditions, the ground engaging means should have as great a bearing area as is practical. In an embodiment having wheels with ground engaging, preferably wide low pressure tires these can have total width substantially equal to that of the car itself, being in fact the interior width of the frame less a narrow clearance between side walls of the tires to permit passage of a drive chain. The disposition aforesaid at alternate sides of the car axes requires that one tire is wide, with the other tire of the co-axial wheels narrow. In this way, while narrower tires could be used, optimum advantage of the invention under adverse bearing conditions is realized with wide and narrow tires as above.

For certain snow and other conditions bearing area and traction are enhanced by providing track ground engaging means. The invention teaches structure such that, the tires being removed, tracks and ancillary drive structure can be substituted for the wheels.

Provision is made for attaching a third, and as many suceeding, cars as might be required, with each car capable of being driven. With the two car vehicle, the steering means restrains the second car with respect to the first car so that their longitudinal axes ore maintained aligned when travelling in a straight line, or are inclined when turning. When a third and succeeding cars are added, horizontal stabilizing means are provided to restrain and to limit horizontal motion as aforesaid.

A detail description following gives examplification of preferred embodiment of the invention, with description of further structure by means of which previous difficulties and disadvantages of known articulated vehicles are reduced.

DESCRIPTION OF DRAWINGS

FIGURE 1 is a diagrammatic side elevation of a three car vehicle according to the invention, FIGURE 1-A is a two car embodiment, FIGURE 2 is a plan view of two adjacent cars with a fragmented vertical stabilizer, and a platform of one car, omitted, FIGURE 9 is a partly sectioned side elevation of another vertical stabilizer embodiment shown in position between adjacent cars, FIGURE 10 shows the action of the FIGURE 9 stabilizer when the adjacent cars are close together, FIGURE 11 shows action of the FIGURE 9 stabilizer with the cars at a maximum distance apart, FIGURE 12 is a simplified fragmented side elevation of adjoining car ends, FIGURE 12-A is a fragmented plan view of a scraper tip, FIGURE 13 is a fragmented end elevation of chain tensioner as seen from 13—13 of FIGURE 12, FIGURE 14 is a generally sectioned view of a differential assembly, with one pair of spider arms spaced at 180° in a plane of the section, FIGURE 15 is a view from line 15—15 of FIGURE 14, with a spider assembly and axles removed, FIGURE 16 is a plan of a differential sprocket, FIGURE 17 is a plan of the spider assembly, FIGURE 18 shows a differential locking bracket.

DESCRIPTION OF PREFERRED EMBODIMENT

Figure 3:
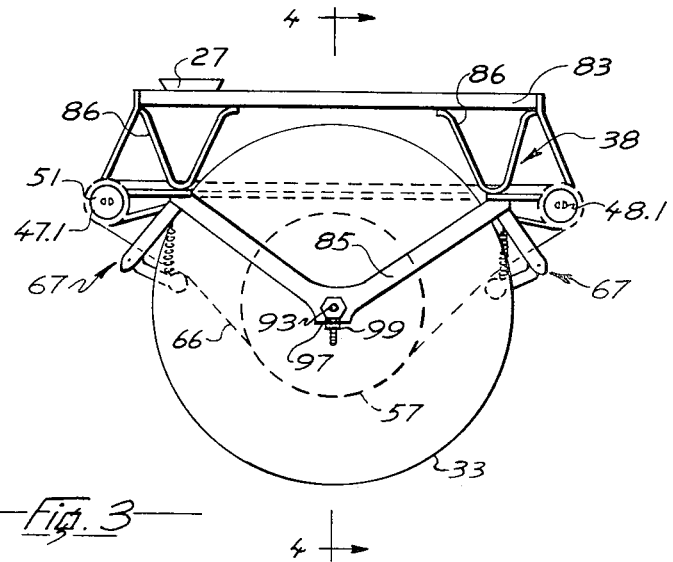
FIGURE 3 is a side elevation of a non-powered car showing structural members, coupling and stabilizing means being omitted.

A detail description following, related to the drawings, give exemplification of preferred embodiment of the invention which however, is capable of expression in structure other than that described and illustrated.

GENERAL DESCRIPTION, FIGURES 1, 1-A, 2

In FIGURE 1, the three car exemplification of the invention is designated generally 20, having a front or a power car 21, a second or middle car 22, and a third or additional car 23. The power car 21 has a prime mover means 24, suitably an internal combustion engine, including a power take-off sprocket 25, and steering means indicated generally at 26. A platform 27 is secured to a frame assembly of the power car, each car having a platform also designated 27. Seats 27.1 suitably reversable, can be provided for the second and third platforms.

Each car has a pair of coaxial ground engaging means, namely wheels, the wheels 29, 31, 32, 33 and 34 being seen in FIGURES 1 and 2. The wheels 29, 32, and 33, are wide with the wheels 31 and 34 being narrow, a remaining wheel of the power car, not here seen, is narrow.

Figure 4:
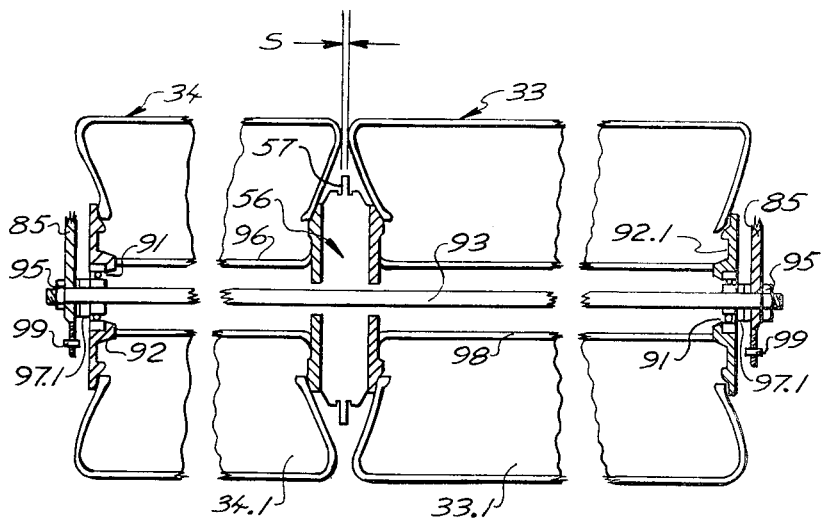
FIGURE 4 is a fragmented section on line 4—4 of FIGURE 3, some parts not being shown in section.

As later will be seen, the cars 22 and 23 can be identical (with the seats being reversible) as shown in FIGURE 2 car 23 is a car as the car 22 turned through 180°. Frame assemblies are designed 37 and 38 respectively. Notwithstanding that these cars, including the frame assemblies, can be identical the description is facilitated by assigning different reference numerals to some particular parts of each said car. A longitudinal axis of each car 22 and 23 is designated 39 (the axes being aligned in FIGURE 2) with transverse axes of wheels of each car respectively indicated at 41 and 42, each wheel axis being normal to the car longitudinal axis when viewed in plan. The wide and narrow wheels are assembled in relative position shown in FIGURE 2 with a narrow wheel of one car adjacent to a wide wheel of an adjoining car, so that spaces between hubs of the co-axial wheels are disposed alternatively on either side of the axes 39. This spacing designated D in FIGURES 2 and 4, is a parameter determining relative tire width, as later particularized.

A three car exemplification has been described above. FIGURE 1-A shows a two car embodiment obtained by omitting car 23. As cars 21 and 22 are herein described in detail, further explanation of FIGURE 1-A is deemed unnecessary.

Shafts 43 and 44 are journalled in spaced brackets severally indicated at 45 and 46, the brackets being secured to the frame 37 of car 22 adjacent outer ends thereof. An intermediate sprocket 47 is keyed to the shaft 43, and an intermediate sprocket 48 to the shaft 44, the sprockets being aligned and positioned so as to be central of a space between the wheels 31 and 32 as shown. At an inner end of the shaft 43 one element 49 of a conventional universal joint is provided, centered on the longitudinal axis 39, a universal joint element 51 is similarly provided at an inner end of the shaft 44, the centre of this universal joint element being also on the axis 39 aforesaid. Similarly journalled shafts of the car 23 are designated 43.1 and 44.1 respectively, with intermediate sprockets 47.1 and 48.1 and universal joint elements 49.1 and 51.1 as shown so that, as seen in FIGURE 2, adjacent universal joint elements aforesaid at inner ends of the shafts 44 and 43.1 join to form a universal joint being both a drive and a coupling means.

At an end of the power car 21 adjacent the car 22 a shaft 52 is provided the shaft being journalled in brackets 53 secured in a frame of the power car. An intermediate sprocket 54 is mounted on the said shaft, an inner end of the shaft being formed in a half universal joint 55 adapted to cooperate with the half universal joint element 49 of the shaft 43 of the car 22. The foregoing structure functions as before described with reference to corresponding elements of the cars 22 and 23. Conventional brake means 52.1 are provided on the shaft 52 the brake having common controls 52.2.

The differential 56, later described in detail with reference to FIGURE 14, is provided on the wheel axis between the wheels the differential having a differential sprocket 57. Referring to FIGURE 2 the differential sprocket 57 is aligned with the intermediate sprockets 47 and 48, as also is the differential sprocket of car 23 with the intermediate sprockets 47.1 and 48.1.

Referring now to FIGURE 1, a driven sprocket 61 and a drive sprocket 62 are mounted on a transverse drive shaft at an end of the power car remote from the shaft 62 aforesaid. A power take-off chain 63 engages the engine power take-off sprocket 25 and the driven sprocket 61. The power car also has a differential 56 having a differential sprocket 57, the drive sprocket 62 being aligned therewith so that a drive chain 64 of the car 21 extending around the drive sprocket 62, the intermediate sprocket 54, and engaging teeth of a lower side of the differential sprocket 57, drives the differential, hence the wheels, of the power car. Drive is transmitted from the power car to the car 22 through the universal joint 55–49 FIGURE 2 driving the intermediate sprocket 47, a drive chain 65 of the second car cooperating with the intermediate sprocket 48 and the differential sprocket 57 of the car 22 as before described. The car 23 is driven in the same manner by a drive chain 66.

HORIZONTAL STABILIZING MEANS, FIGURE 2

To restrain and to limit rotation in a horizontal plane of car 22 relative to car 23 about the universal joint 49.1–51, horizontal stabilizing means designated generally 78 and 78.1 are provided between the adjacent cars 22 and 23 as shown in FIGURE 2.

The stabilizing means 78 has a spring 79 opposite ends of which are secured to outer ends of adjacent lower frame sub-assembly members 85.3 as seen at 80 and 81 with each end of a limiting chain 82 also secured at 80 and 81. The chain 82 has a length such that, when the cars rotate in a horizontal plane relatively to one another about the universal joint to a position beyond which interference would occur, the chain is taut, and limits the rotation to an angle such that adequate clearance is maintained. In such position the spring of the opposite stabilizing unit is thus at its minimum length, the springs desirably being just untensioned when the car axes are aligned. It is seen that horizontal rotation within positive limits is thus provided with the restraint increasing, according to the strength and tension of the springs, as the cars depart from the aligned position shown in FIGURE 2. With the angle of rotation limited as above, both chains are slack in the aligned position. The chains can be effectively shortened to reduce the angle by securing them at intermediate links. When desirable, the limiting angle can be made to approach zero.

The drive means so far described permits movement of one car relative to an adjoining car both in a vertical and in a horizontal plane rotating about the centre of the universal joint—vertical and horizontal as used above, and herein after, having reference to the vehicle resting upon level ground—and also permits relative axial rotation such as when one wheel encounters a ground irregularity.

FRAME AND WHEEL ASSEMBLY, FIGURES 2, 3 AND 4

As seen in FIGURES 2 and 3, the frame assembly 38 has an upper element designated generally 83 spaced from V-shaped axle supporting members 85, 85.1, at opposite sides of the frame assembly. The supporting V-members are spaced from the upper element 83 by bracing means 86, the said element having spaced parallel members 87, 88, defining back and front portions thereof as seen in FIGURE 2.

Referring to FIGURE 4, bearings 91 are provided adjacent outer ends of a fixed through axle 93, outer wheel hubs 92 and 92.1 being journalled on the bearings. A cylindrical core 96 extends from an inner face of the outer hub 92 to a hub portion of the differential 56, with a cylindrical core 98 extending from an opposite hub portion of the differential to the hub 92. The fixed axle 93 is secured at one end in a vertical slot 97 of a central lower apex of the V-shaped axle supporting member 85, with obvious nut and spacing means 95, 97.1 as shown. Bolt and locknut adjustment means 99 are provided to that the position of the fixed axle in the slot can be adjusted. An opposite end of the axle is similarly secured in the V-member 85.1. It is seen that the wheels 33 and 34 are journalled on the bearings 91. The wheel hubs 92 and 92.1, and the differential hub portions, are constructed and arranged to accept beads of low pressure, suitably tubeless, tires 33.1 and 34.1, of required wide and narrow sizes. Upper ends of the V-members are secured to a generally rectangular lower frame sub-assembly having front and back members 85.2, 85.3, best seen in FIGURE 2.

Wide and narrow wheels, and wide and narrow tires, are preferred with a differential element forming a hub to accept a tire bead as described. The wide and narrow tires have adjacent inner peripheral edges, viz tire side walls narrowly spaced as indicated at S in FIGURES 2 and 4 by a distance sufficient only to accommodate the drive chain. In this way, the ground engaging means (here tires of wheels) have a combined width substantially the full width of a car, less the space S. Relative widths of the wide and narrow tires is determined by the parameter D, FIGURE 2.

STEERING, FIGURES 5 AND 6

The steering means indicated generally at 26 FIGURE 1, being located at an end of the power car adjacent the intermediate car, is constructed and arranged to rotate the intermediate car relative to the power car about the universal joint. As previously stated, this universal joint is centered on the longitudinal axis of the car, the position of the universal joint center being indicated in FIGURE 5 referenced 49–55.

Figure 5:
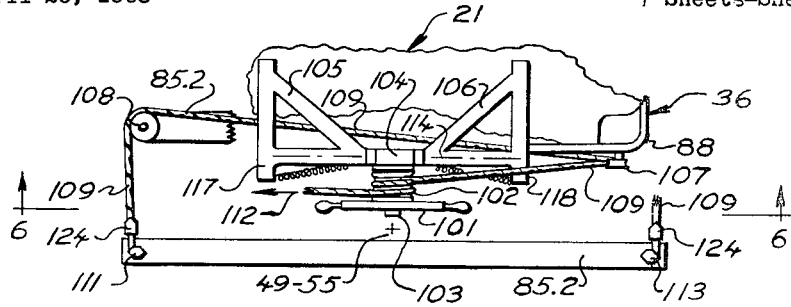
FIGURE 5 is a fragmented plan showing steering means.
Figure 6:
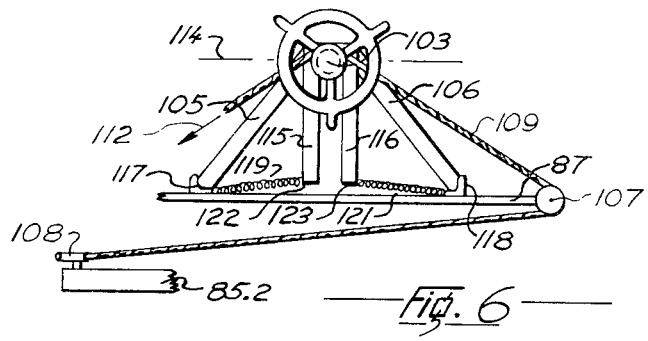
FIGURE 6 is an elevation as seen from 6—6 FIGURE 5.

The steering means has a steering wheel 101, including a drum 102, rotatable about a shaft 103 secured in a pivot block 104. The pivot block is pivoted between upper ends of A-frame members 105 and 106, lower ends of the A-frame members being spaced apart as seen in FIGURE 6. Rotation of the pivot block is restrained, by means about to be described, so that the steering wheel shaft 103 is, when the cars are at rest on a flat level surface, generally horizontal. As before stated, the frame assemblies of each car are the same, the frame of the second car being rotated 180° with respect to the frame of the first car. Thus the power car has a frame element 88, FIGURE 5 adjacent the corresponding frame element of the car 22. A first pulley 107 is journalled on a short outwardly extending horizontal shaft secured adjacent an end of the element 88 as shown in FIGURE 5, and a second pulley 108 is journalled on a short vertical shaft extending upwards, and secured in an end of the power car lower frame assembly member 85.2 remote from the pulley 107 aforesaid. The corresponding sub-assembly element 85.2 of the second car is seen in FIGURES 2 and 5. A steering cable 109 is secured to a point of attachment of the said sub-assembly member of the second car substantially opposite the pulley 108 as seen at 111 FIGURE 5. The cable leads forward from the point of attachment 111, around the pulley 108, to and around the pulley 107, and then is wound a few turns around the wheel drum 102, the cable continuing as indicated by an arrow 112 to additional pulleys (not shown) corresponding to the first or second pulleys 107 and 108 aforesaid. From the foregoing it is seen that rotation of the steering wheel 101 will cause rotation of the second car 22 element 85.2 about the universal joint centre 49–55, the rotation being in a horizontal plane.

Downwardly extending parallel spaced arms 115, 116 have upper ends secured in the pivot block 104, the A-frame members 105 and 106 have outwardly extending lower members 117 and 118 at outer ends of these members, that is to say at ends thereof extending towards the car 22. Tension springs 119 and 121 are attached at the said outer ends, the springs extending to lower ends of the arms 115 and 116 being thereto respectively attached as seen at 122 and 123. With adjacent car axes aligned, the cars being on level ground, the springs are in tension when the steering wheel shaft 103 is horizontal. It is seen that in this position—as shown in FIGURE 5—the spring tensions will exert moments tending to tension the cable 109. Common adjustable clamps 124, or turnbuckle means (not shown) are provided, suitably at the points of attachment 111 and 113, for cable length adjustment purposes.

It is seen that the spring and arm means maintain tension in the steering cable. In traversing rough terrain and in steering in those conditions, the effective length of the cable tends to change. This results in rotation of the pivot block 104 about its axis 114, thus compensating for the change. Thus the structure aforesaid maintains effective length of the steering cable sensibly constant whilst providing adequate tension—according to the strength of the springs and the length of the cable.

VERTICAL STABILIZING MEANS, FIGURES 9–12

Where the invention is embodied in a two car train having a power car and a second car, the steering means serves to restrain longitudinal axes of the car in a generally aligned position in moving in a straight line, or at a desired inclination when turning. In an embodimet having three cars, means have been described to restrain and to limit relative motion of the adjacent second and third—succeeding if any—cars in a horizontal plane. Since each car has but one pair of wheels on a common axis, means are provided to prevent jack-knifing of adjacent cars in a vertical plane. Structure to control and to limit such motion is hereinafter referred to as vertical stabilizing means. It is to be understood that the said means do not maintain adjacent platforms co-planar except under particular travelling conditions.

A vertical stabilizing means assembly 130 is now described in detail with reference to FIGURES 9, 10, 11. The means function as above, and also damp relative motion. The stabilizing means also permit twisting, as previously mentioned, of one unit with respect to another such as when encountering irregularity causing the axles of adjacent vehicles to assume different angles' to a horizontal plane, i.e. to rotate on its own axis about the universal joint centre, i.e. to rotate axially.

Figure 8:
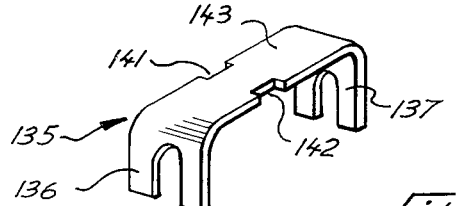
FIGURE 8 is a perspective of a spanner piece of the stabilizer.
Figure 19:
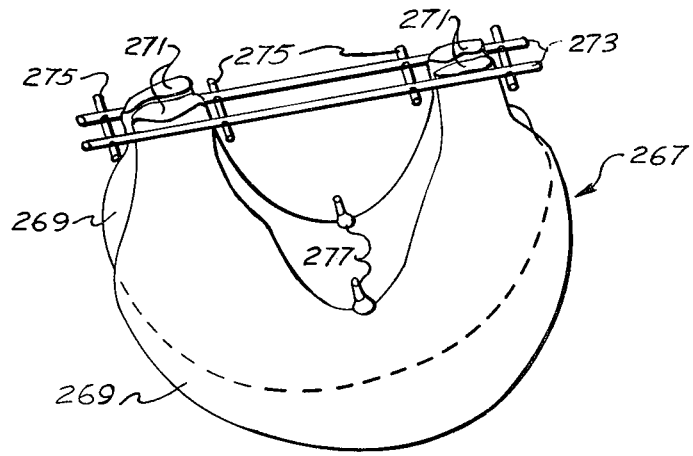
FIGURE 19 is a perspective of lateral stabilizing and buoyant structure, with tubes thereof unclamped, and with a board removed.

As seen in FIGURE 9, the assembly 130, shown in position between cars 22 and 23, has a through bolt 131 having locknuts 132 at each end thereof, and a disc welded thereto in an intermediate position forming a collar 133. The bolt is a loose fit, as below particularized, to holes in the adjacent frame members 88 of the cars 22, 23, the holes being on the car longitudinal axes. When assembled, the stabilizing means in a normal position will appear as seen in FIGURE 9 with a resilient means, e.g. helical spring 134, between the collar 133 and the member 88 of car 22. A spanner piece 135 (generally as seen in FIGURE 8) has upturned ends 136, 137, slotted to fit over the bolt, and is secured by an obvious clamp not shown. The end 136 is inserted between an outer face of the frame member 88 of car 22, and the end 137 is adjacent an inner surface of the member 88 of car 23 as seen, with the spring 134 bearing against the collar 133 at one end, and against the spanner piece end 316 at its other end. FIGURES 10 and 11 show relative positions of elements of the assembly under different conditions, viz limits of maximum and minimum separation of the adjacent member 88 as they rotate in a vertical plane relatively to one another about the universal joint centre. It is seen that the spanner piece upturned ends act to compress the spring in both positions above.

As seen in FIGURE 9, in a normal position the bolt 131 extends outwards of the end 137 of the spanner piece as indicated at 138. For travelling over a moderately rough terrain a packing piece 139, for instance a length of thick rubber hose and can be provided slipped over the outwardly extending end 138 secured as shown by the nuts 132. If desired, the packing piece can be rigid, e.g. a metal collar, when the cars are effectively locked against jack-knifing while still free to rotate axially as aforesaid. This structure becomes equivalent to a bolt securing means with, e.g. a central spacing collar. The hose, a second resilient means, provides much more restraint than the spring alone.

When the frame members 88, 88 of the cars 22, 23, are at minimum separation (the FIGURE 10 condition), these members are inclined to one another with bottoms thereof spaced further apart than their top walls 88.3. At maximum separation FIGURE 11, the inclination is opposite with the top walls further apart. It is required that the bolt be able to assume any position between these limits, and also to assume inclinations arising when the vehicle is turning or when one wheel encounters a ground irregularity. Loose fit is intended to mean, bolt fit or structure such as to permit a range or inclinations as above.

ALTERNATIVE STABILIZING MEANS, FIGURES 7 AND 8

Figure 7:
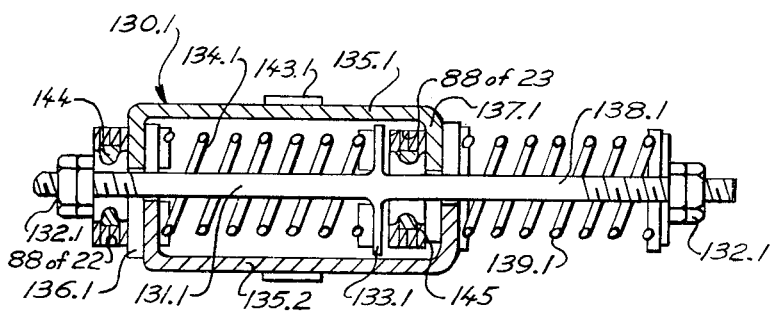
FIGURE 7 is a partly sectioned side elevation of a vertical stabilizer embodiment shown in position between adjoining cars.

An alternative stabilizing means 130.1 is shown in FIGURE 7, having a through bolt 131.1, lock nuts 132.1, a collar 133.1, a helical spring 134.1, a spanner piece 135.1 having upturned ends 136.1 and 137.1, with an outwardly extending bolt portion 138.1 being provided with resilient means 139.1. The elements recited above are equivalent to the elements 131–139 of the FIGURE 9 embodiment.

Additionally, there is provided a second spanner piece 135.2 which can be identical to the spanner piece 135.1 being inserted as shown with its upturned ends against inner and outer faces respectively of the upturned ends 136.1 and 137.1 of the spanner piece 135.1 as shown. Each spanner piece 135.1, 135.2 is provided with oppositely disposed grooves 141 and 142 generally central of a spanner portion 143 extending between the upturned ends aforesaid, adapted to receive a clamp 143.1 serving to secure the two pieces to one another. Additionally, washers 144 and 145 are provided inserted in the openings of each member 88, with the bolt 131.1 passing through the washer, thus being protected from wear resulting from direct contact with walls of the said openings. Suitable plastic washers are obtainable from usual trade sources and can be used in both embodiments. It has been pointed out in describing FIGURES 9, 10, 11 that loose fit of the bolt is required to permit a range of inclination. With plastic washers of suitable fit, the same range is attained. With the bolt extending through a ball and the ball secured in a suitable socket of a member 88—which embodiment is not shown—the required range of the inclination can also be attained. Hence the ball and socket is equivalent to the other embodiments.

Each of the embodiments provides resilient restraint, and limits relative vertical rotation of adjacent cars. One vertical stabilizing means is required between all adjoining cars—located centrally.

FIGURES 12, 13, CHAIN TENSIONING MEANS

FIGURES 12 and 13 show drive chain tensioning means generally indicated by the numeral 67. The tensioning means includes a downwardly depending bracket having parallel spaced members 68, upper ends of which are secured to a frame part of the car 22. A forked member having parallel spaced arms 69 is journalled on a shaft 70 at lower ends of the space arms 68. A jockey sprocket 71 is journalled on a shaft 72 at lower ends of the spaced parallel arms 69 of the fork, with tension springs 73 extending from outer ends of the shaft 72 upwards to points of attachment to the frame of the car. The chain 65 passes between the spaced members 68 with the jockey sprocket 71 being urged upwards against the chain by the spring means 73. In this way, slack in the chain is taken up. Chain tensioners as above described are provided for each of the drive chains.

SCRAPER MEANS, FIGURES 12 AND 12-A

In freezing or snow conditions, or in some kinds of mud, deposits can build up on the differential sprockets. To reduce the build up, a scraper arm 74 has an upper end secured in a frame part with the lower end having a rectangular notch 75 as seen in FIGURE 12-A, of width to accommodate the sprocket. The scraper is disposed generally tangentially to the differential sprocket 57 and has a lower end bevelled as shown to provide a chisel edge. At least the differential sprocket of the first car should be provided with at least one scraper as described.

With the vehicle moving forward, differential sprocket rotation is in a direction as indicated by an arrow 77, in certain conditions intolerable build up can occur breaking a chain, or causing it to leave the sprocket. Without this, or an equivalent, scraper operation in conditions as above described can become so difficult as to be impractical.

THE DIFFERENTIAL, FIGURES 14 THROUGH 1ᵃ

Spaced inner hubs 232 and 232.1 of the differential 56 are secured to adjacent ends of the central cores as before stated. A frusto-conical element 234 is secured to the hub 232, and a similar frusto-conical element 234.1 to the opposite hub 232.1. An inner surface of each frusto-conical element aforesaid has a groove 235 to accept balls 236 of a ball cage particularized below. The differential sprocket 57 has a web 236.1 provided with circumferentially spaced circular openings therethrough, the balls 236 being retained in these openings thus forming the ball cage. Bevel spider pinions 239, 241, of a spider assembly engage drive bevel pinions 242, 243, secured in the hubs aforesaid and freely rotatable of the fixed axle 93. Thus the spider, sprocket, and pinions, form a differential, further details of which are shown diagrammatically in FIGURES 15, 16, 17.

FIGURE 15 shows the drive pinion 243 secured in the hub 232 coaxial and clear of the fixed axle 93.

FIGURE 16 shows the differential sprocket 57 with balls 236 seated in the web openings, the sprocket having a central circular opening upon inner side walls of which are secured three equally spaced lugs, severally designated 238.1, cooperating with shafts of the spider assembly.

The spider assembly is shown in FIGURE 17 indicated generally by the numeral 240. A collar 240.1 has spider shafts 239.1, 241.1, upon which the two spider pinions 239 and 241 are journalled, a third spider pinion 243.1 being journalled on the shaft 241.2. The spider shafts assembled in the differential are engaged by the spaced lugs 238.1, FIGURE 16, so that the spider assembly rotates with the sprocket 57—thus differential drive of the hubs is provided. It is seen means are provided for free motion, of the nature of backlash, to the extent of a third of a revolution of the spider assembly, since the lugs 238.1 are spaced apart by that amount. This provision is deliberate, and has been found to be of advantage.

Referring now to the balls 236 FIGURE 16, but one circumferential row is shown. Thus sliding as well as rolling contact can occur between the balls and cooperating grooves. While this arrangement is adequate in practice, obviously two sets of balls can be used, each set cooperating with a groove of an outer surface of the web of the drive sprocket. This alternative is not shown.

Means are provided to lock the differential so that both hubs are driven together. A locking device 250 FIGURE 18 has spaced parallel pins 251 and 252 at opposite ends of a cross member 253, spaced holes 254, 255, being provided in the cross member. The web 236.1 of the differential sprocket 57 has circumferentially spaced holes 256, 257, to accept the pins 251 and 252. Referring now to FIGURE 14, with the locking device 250 in place as shown, the pins extend through the web 236.1 of the differential sprocket, and bolts 258 passing through the cross member holes 254, 255 (FIGURE 18) secure the locking device to the frusto-conical element 234, so locking the differential. Additional locking devices can be provided if necessary. It will be understood that the locking feature can be of value in certain snow and ice conditions, and it is also to be noted that it provides means selectively to lock one or more differentials as might be required. When so locked, the drive is equivalent to what would be obtained without a differential.

DESCRIPTION OF FIGURES 19 THROUGH 21

Figure 20:
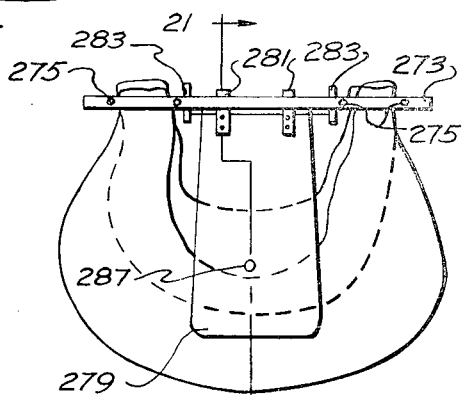
FIGURE 20 is a side elevation showing means of attaching the structure of FIGURE 19 to a car, the car not being shown.
Figure 21:
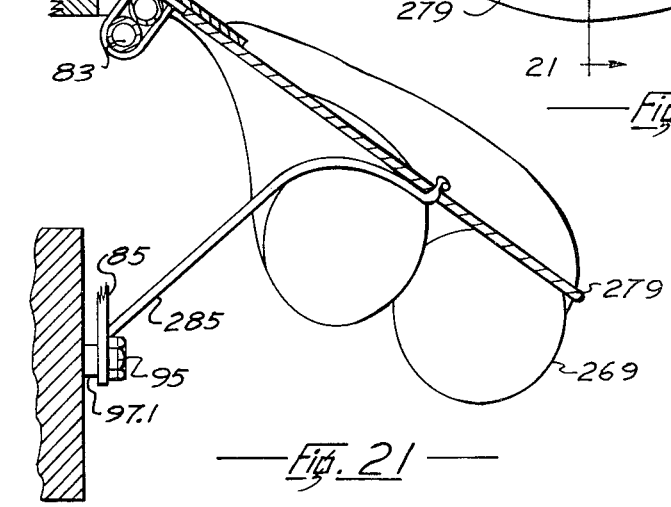
FIGURE 21 is a fragmented section on line 21—21, FIGURE 20, parts of car shown.

Lateral stabilizers, generally 267, can be halves of common automobile inner tubes 269, having cut ends 271 sealed, and clamped between two parallel tubes 273, clamping force being maintained by obvious nut and bolt means 275. The inner tube halves have valves 277, allowing each half to be inflated independently of the other. A board 279 is held in position, as shown in FIGURE 20, by clips 281 which hook around the tubes 273 which, in turn, are clamped against the upper element 83 of the frame assembly by U-bolts 283, FIGURE 21, suitable clearance holes being provided in the platform 28. Buoyant forces acting on the tubes when the vehicle is in water are transmitted by a simple rope tie 285, one end of which is secured for instance at the V-member 85, with the other end threaded through a hole 287 in the board 279 and suitably secured.

Structure as above described provides removable means to increase buoyancy and stability of a car.

ALTERNATIVE GROUND ENGAGING MEANS, TRACK, FIGURES 22, 23, 24

Ground engagement means previously described herein, namely wheels with for instance low pressure tires, provide a relatively large bearing area, and are provided with a common snow tread, or the equivalent, so as to be adequate for certain snow, ice, and mud, conditions. Structure according to the present invention can readily be adapted to a track ground engagement means, so to provide greater bearing area and consequent advantages as known in the art.

Figure 22:
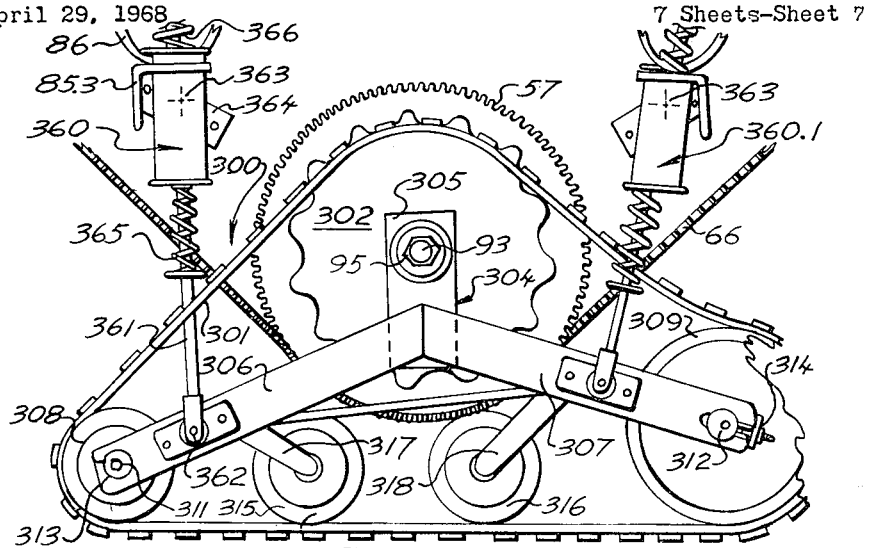
FIGURE 22 is a fragmented side elevation showing track ground engaging means.
Figures 23, 24:
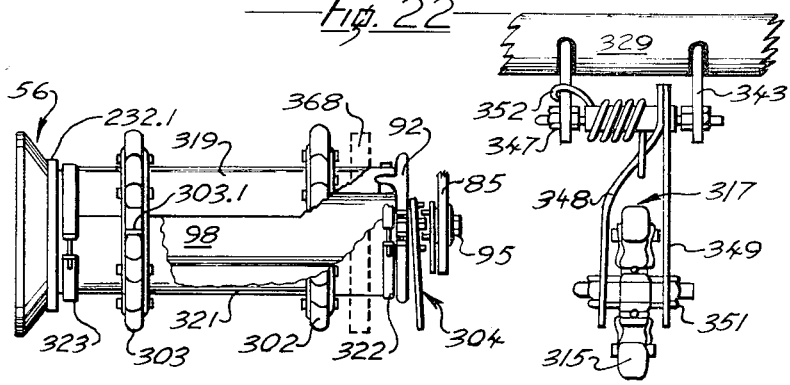
FIGURE 23 is a fragmented view of one drum and drive means, the axle being removed.
FIGURE 24 is an end view of an idler wheel mounting, the wheel being sectioned.

In FIGURE 22 track ground engaging means indicated generally by the numeral 300 have a flexible track 301 driven by outer and inner track drive sprockets, best seen in FIGURE 23, there designated 302 and 303 respectively. A framework 304 has a generally vertical arm 305 and, secured at a lower end of this are, are downwardly inclined members 307, 306. The arm and inclined members aforesaid define frame structure generally of inverted Y-shape as seen in FIGURE 22. The arm 305 is mounted for rotation, as later described, about the through axle 93. Rear and front bogie wheels 308 and 309 are journalled on shafts 311 and 312 at lower ends of the inclined members 306 and 307 respectively, with obvious adjusting means 313 and 314 being provided for the shafts. Idler wheels 315 and 316 are mounted at lower ends of forked arms 317 and 318 shown in detail in FIGURE 24, with spring means urging the idler wheels in contact with an inner surface of the track 301.

Referring now particularly to FIGURE 23 hollow semi-cylindrical members 319 and 321 are secured over the differential hub 232.1 and the hub 92, fastened together by clamp means 322 and 323 to form a drum. The outer and inner track drive sprockets 302 and 303 are circumferentially clamped halves secured to the drum in spaced relationship according to the width of the track—a joint between the halves being seen at 303.1.

Figure 25:
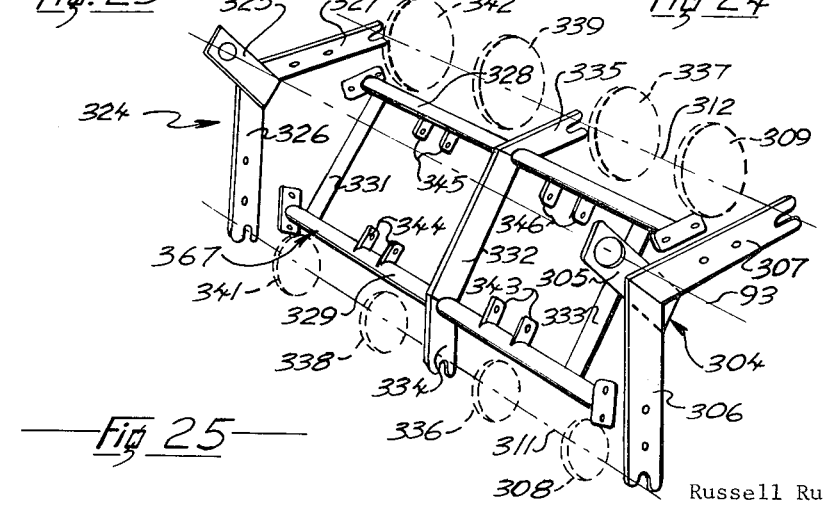
FIGURE 25 is an exploded perspective of an assembly of some track frame elements.

Referring now to FIGURE 25, a framework generally 324 is similar to the framework 304 aforesaid having a vertical arm 325 and downwardly inclined members 326 and 327 corresponding to those of the framework 304, with the vertical arm 325 secured as previously described with respect to the arm 305 at an end of the fixed axle remote from the vertical arm of the frame 304. Spaced parallel rods 328 and 329 are secure to the members 307, 327, 306, 326, respectively, adjacent their lower ends. Ends of a cross brace 331, 332, 333 are secured to the spaced rods 328, and 329 with the inclined members also secured to the said rods as seen in FIGURE 25, with lower ends of the inclined members 326 and 327 aligned with the lower ends of the inclined members 306 and 307 so that the shafts 311 and 312, indicated in FIGURE 25 by their centre lines only, are supported at each end. The shafts can be continuous, being secured in lower ends of the opposite framework 324 as before described with reference to the framework 304 with adjustment means, as the before described adjustment means 313 and 314, being provided. The bogie wheels 308, 309 are journalled on the shafts 311 and 312 adjacent the inclined members 306 and 307 respectively, with a second set of bogie wheels 336 and 337 being journalled on the said shafts adjacent downwardly inclined members 334 and 335 respectively, axial spacing between the bogies being in accordance with width of the flexible track. Similar bogie wheel pairs 338, 339, and 341, 342, are similarly disposed on the shafts 311 and 312—it being understood that the spacing between the bogie pairs 308, 336, and 309, 337, is narrow being less than wider spacing between the bogie wheel pairs 338, 341 and 339, 342. The track 301, FIGURE 22, is narrow, adapted to engage a narrow spaced bogie pair, with a track (not shown) engaging the wider spaced bogie pairs. Inwardly disposed parallel bracket pairs 343 and 344, 345 and 346 are secured to the rods 329 and 328 respectively with the bracket pair 345 aligned with the bracket pair 344, and the bracket pair 346 aligned with the bracket pair 343.

In FIGURE 24, the forked arm 317 is shown journalled at 347 in the bracket pair 343, at lower ends thereof. The arm 317 has spaced forks 348, 349, with the idler wheel 315 journalled between the forks adjacent lower ends thereof as seen at 351. Spring means 352 cooperating with a bracket 343 of the pair and with the fork 348 urge the bogie wheel 315 (see now FIGURE 22) against the track inner surface. The bogie wheel 316 is similarly mounted, as are bogie wheels, not shown, cooperating with the opposite track.

In FIGURE 22, a resilient restrainer is designated generally 360 having an extensible and retractable rod element 361, an outer end of which is pivoted as seen at 362 to the member 306. An upper part of the restrainer is mounted to be effectively rotatable of a shaft (not shown) a centreline of the shaft being indicated at 363. The said shaft is secured in a plate 364 obviously attached to a fixed frame member 85.3. Springs 365, 366 restrain extension and retraction of the rod 361. With only one resilient restrainer, the springs aforesaid are constructed and arranged so that with no load on the springs the rod 361 is in the position shown in FIGURE 22 with the arm 305 generally vertical.

Referring again to FIGURE 25, an assembly of the elements there shown is designated generally 367. This is a rigid structure, therefore the frames 304 and 324 must rotate in unison about the axis of the through axle 93. Consequently, while at least one restrainer should be used, it is in a practical sense desirable to provide a restrainer cooperating with each of the four downwardly inclined frame members to reduce tortional stress in the assembly 367. If at least one restrainer is not provided, the track ground engaging means will still be operative in a vehicle having two or more cars, since the vertical stabilizer will function as previously described with reference to wheeled embodiment—the track cooperating with the through axle 93 by rotation of the assembly 367 about said axle. An additional restrainer is shown in FIGURE 22, designated generally as 360.1.

Remarks above relative to the space S and the parameter D, FIGURE 2, and optimum advantage of the invention being realized when the total ground engaging means width is substantially the full width of a car, apply as well to the track embodiment.

From the foregoing description generally, it is seen that conversion from wheeled to track embodiment is readily effected. Alternatively to the half sprocket assemblies 302, 302 split sprockets (not shown) generally according to Canadian Patent 612,214 can be used.

Alternatively to the steering means illustrated in FIGURES 5 and 6, in the track embodiment steering can be effected by applying conventional braking means to the drum formed by the hollow cylindrical members 319 and 321 as indicated in broken outline at 368. In order to be able to steer in both directions, a second braking means (not shown) is required to brake an opposite track.

FURTHER CHARACTERISTICS OF THE INVENTION

An embodiment of the invention particularly adapted to the instant purposes contemplates cars having overall width of, suitably, about thirty inches. A two car embodiment generally according to FIGURE 1–A is a practical possibility, usually at least three cars in a configuration generally as illustrated in FIGURE 1 are used, with an operator seated on the central car his heels suitably in cut outs of the platform of the first car.

A particular differential providing free motion of the nature of backlash has been described and illustrated, and it is emphasized that this particular differential need not be used since (substantially) any common differential mechanism, including for instance limited slip or self-locking devices, can be substituted. In fact, particularly in certain terrain conditions it can be of advantage to lock at least one differential, structure effecting such locking has been described and illustrated. With a differential as herein particularized locked as aforesaid, that part of the drive is equivalent to drive mechanism without a differential, for instance a simple sprocket suitably secured between adjacent wheel hubs. A particular steering means has been described and illustrated, which steering means is distinguished from previous steering means known to the present inventor by the provision to maintain sensibly constant (effective) cable length and tension. Other rope and tiller or rope and wheel, or geared, steering means can obviously be substituted for the particular steering means herein described, still realizing at least many of the advantages of the invention.

A vehicle according to the present invention is versatile, the backlash differential provision and the possibility of selectively locking one differential, the vertical and horizontal stabilizer constructions which permit, in tracked or wheeled version, traversing narrow trails and difficult terrain, produce a single vehicle well adaptable to a large range of conditions.

What is claimed is:

1. An articulated vehicle of at least two cars each car having: a transverse axis; first and second ground engaging means cooperating with a through axle centered on the axis aforesaid; a frame assembly extending from the axis to a platform secured at a top of the frame, with outer ends of the through axle secured in spaced end members of the frame; and each car having a longitudinal axis; the vehicle being a combination including,
   (a) a power car, being one of two cars, having a prime mover and means adapted for the prime mover to drive a ground engaging means of the said car,
   (b) a coupling means of the power car having centre which lies in the longitudinal axis, a coupling means of a second of the two cars having a centre which lies in the longitudinal axis of the second car, the coupling means of the power car being adapted to cooperate with the coupling means of the second car to attach the cars to one another at adjacent ends thereof, with the cars being free to rotate relatively to one another about the coupling means centre both in a vertical and in a horizontal plane, and about their longitudinal axes,
   (c) steering means adapted relatively to rotate the first and second cars in a horizontal plane,
   (d) and vertical stabilizing means extending between adjacent frame members of the two cars.

2. A combination as set forth in claim 1, the coupling means being adapted to drive a ground engaging means of the second car.

3. A combination as set forth in claim 2
   (a) with a space being defined between said ground engaging means,
   (b) a differential in each space, the differential having a sprocket and the axle being central of the sprocket,
   (c) the differential sprocket of the power car being disposed at one side of the longitudinal axis, and the differential sprocket of the second car being oppositely disposed from the longitudinal axis of the second car,
   (d) chain drive means extending from a drive sprocket (62) of the power car, driving the differential sprocket thereof and driving an intermediate sprocket (54) of a shaft of the coupling means, so rotating said shaft,
   (e) the coupling means of the second car having a shaft adapted to be rotated when the coupling means shaft of the first car is rotated, a sprocket (47) on the second car coupling means shaft, the second car having a second coupling means, including shaft and intermediate sprocket, at an opposite end of the second car, and chain drive means cooperating with the second car intermediate sprockets driving the second car differential sprocket.

4. A combination as set forth in claim 3, the vertical stabilizing means (130) having
   (a) adjacent end members of adjacent cars having holes, a bolt having an intermediate collar passing through the holes being a loose fit to side walls thereof, locknuts at outer ends of the bolts,
   (b) a spanner piece having first and second upturned ends slotted to receive the bolt, the first upturned end engaging an inner side wall of one said end member, the second upturned end engaging an outer side wall of the adjacent end member,
   (c) resilient means between the second upturned end and the collar with the bolt passing there through and the resilient means urging the upturned ends against the walls aforesaid.

5. A combination as set forth in claim 4 the vertical stabilizing means (130.1) having a second resilient means, the bolt extending outwards of the first upturned end therethrough, the said second resilient means being adapted to restrain the bolt against movement tending to reduce extension of the bolt outwards of the first upturned end.

6. A combination as set forth in claim 1, the steering means having a cable, and including means to maintain sensibly constant cable length and tension.

7. A combination as set forth in claim 5, the steering means having a cable and including means to maintain sensibly constant cable length and tension.

8. A combination as set forth in claim 3, a differential having means to provide free motion of the nature of backlash.

9. A combination as set forth in claim 3, means selectively to lock a differential (250).

10. A combination as set forth in claim 3, and scraper means (74) disposed generally tangentially to a differential sprocket and adapted to reduce build up on the sprocket.

11. A combination as set forth in claim 3 the ground engaging means being tires of wheels.

12. A combination as set forth in claim 7, the ground engaging means being tires of wheels.

13. A combination as set forth in claim 12, and drive chain tensioning means (67).

14. A combination as set forth in claim 3, and removable means (267) to increase buoyancy and stability of a car.

15. A combination as set forth in claim 11, and drive chain tensioning means (67).

16. A combination as set forth in claim 3, the ground engaging means (300) including a flexible track.

17. A combination as set forth in claim 16,
   (a) a drum of hollow semi-cylindrical members secured between a hub at an outer end of the through axle and hub of the differential,
   (b) a drive sprocket secured to the drum,
   (c) the flexible track extending around said sprocket and being driven thereby,
   (d) the track extending around spaced bogies secured at outer ends of downwardly inclined members of a framework, with an outer side of the track between said bogies in contact with the ground,
   (e) the framework and bogies thereto secured being rotatable of the through axle.

18. A combination as set forth in claim 17, and an idler wheel (317) intermediate of the bogie wheels urged against and inner side of the flexible track.

19. A combination as set forth in claim 18, and drive chain tensioning means (67).

20. A combination as set forth in claim 19, and means (250) selectively to lock a differential.

21. A combination as set forth in claim 20,
(a) a drum of hollow semi-cylindrical members secured between a hub at an outer end of the through axle and hub of the differential,
(b) a drive sprocket secured to the drum,
(c) the flexible track extending around said sprocket and being driven thereby,
(d) the track extending around spaced bogies secured at outer ends of downwardly inclined members of a framework, with an outer side of the track between said bogies in contact with the ground,
(e) the framework and bogies thereto secured being rotatable of the through axle,
(f) and brake means of the drum effecting steering of a car.

22. A combination as set forth in claim 21 and, an idler wheel (317) intermediate of the bogie wheels urged against an inner side of the flexible track, the steering means having a cable, and including means to maintain sensibly constant cable length and tension, scraper means (74) disposed generally tangentially to a differential sprocket and adapted to reduce build up on the sprocket, drive chain tensioning means (67), and a differential having means to provide free motion of the nature of backlash.

23. A combination as set forth in claim 1, a third car being coupled to the second car, and horizontal stabilizing means (78) interconnecting the second and third cars.

24. A combination as set forth in claim 3, a third car being coupled to the second car, and horizontal stabilizing means (78) interconnecting the second and third cars.

25. A combination as set forth in claim 24, the steering means having a cable, and including means to maintain sensibly constant cable length and tension, the ground engaging elements being tires of wheels.

26. A combination as set forth in claim 2,
(a) a space being defined between said ground engaging elements, with the ground engaging elements being flexible tracks,
(b) a differential in each space, the differential having a sprocket and the axle being central of the sprocket,
(c) the differential sprocket of the power car being disposed at one side of the longitudinal axis, and the differential sprocket of the second car being oppositely disposed from the longitudinal axis of the second car,
(d) chain drive means extending from a drive pinion of the power car driving the differential sprocket thereof and driving an intermediate sprocket of a shaft of the coupling means rotating said shaft,
(e) the coupling means of the second car having a shaft adapted to be rotated when the coupling means shaft of the first car is rotated, a sprocket on the second car coupling means shaft, the second car having a second coupling means including shaft and intermediate sprocket, at an opposite end of the second car, and chain drive means cooperating with the second car intermediate sprockets driving the second car differential sprocket,
(f) a drum of hollow semi-cylindrical members secured between a hub at an outer end of the through axle and hub of the differential,
(g) a drive sprocket secured to the drum,
(h) the flexible track extending around said sprocket and being driven thereby,
(i) the track extending around spaced bogies secured at outer ends of downwardly inclined members of a framework, with an outer side of the track between said bogies in contact with the ground,
(j) the framework and bogies thereto secured being rotatable of the through axle,
(k) an idler wheel (317), intermediate of the bogie wheels, urged against an inner side of the flexible track,
(l) the steering means having a cable, and including means to maintain sensibly constant cable length and tension,
(m) scraper means (74) disposed generally tangentially to a differential sprocket and adapted to reduce build up on the sprocket,
(n) drive chain tensioning means (67),
(o) and at least one differential having means adapted to provide free motion of the nature of backlash.

27. A combination as set forth in claim 11, the tires of a car having adjacent inner peripheral walls, a narrow space(s) being defined between said walls.

28. A combination as set forth in claim 27, the tires having a combined width substantially the full width of a car.

29. A combination as set forth in claim 17, and at least one resilient restraining means (360) adapted to restrain rotation of the framework about the axle.

30. A combination as set forth in claim 3, the ground engaging means having adjacent inner edges, a narrow space being defined between said edges.

31. A combination as set forth in claim 30, the ground engaging means having a combined width substantially the full width of a car.

References Cited

UNITED STATES PATENTS

| | | | |
|---|---|---|---|
| 1,373,981 | 4/1921 | Smith | 180—50 |
| 1,704,296 | 3/1929 | Ledwinka | 180—14 |
| 2,673,616 | 3/1954 | Moores | 180—14 |
| 3,048,233 | 8/1962 | Crain et al. | 180—49 |
| 3,215,219 | 11/1965 | Forsyth et al. | 180—14 |
| 3,291,244 | 12/1966 | Garrett | 180—51 |

KENNETH H. BETTS, Primary Examiner

U.S. Cl. X.R.

114—123; 115—1; 180—9.26, 9.4, 51; 280—408, 419, 487